Nov. 26, 1929.  G. H. DERBYSHIRE  1,737,151
HOLDING DEVICE
Filed June 15, 1926  2 Sheets-Sheet 1

Inventor:
George H. Derbyshire,
By Jno. Bozndale
Attorney.

Nov. 26, 1929.    G. H. DERBYSHIRE    1,737,151
HOLDING DEVICE
Filed June 15, 1926    2 Sheets-Sheet 2

Inventor:
George H. Derbyshire,
By
Attorney.

Patented Nov. 26, 1929

1,737,151

UNITED STATES PATENT OFFICE

GEORGE H. DERBYSHIRE, OF GERMANTOWN, PENNSYLVANIA

HOLDING DEVICE

Application filed June 15, 1926. Serial No. 116,124.

My invention relates to holding devices. The object is to provide detachable and adjustable means for securing any number of supporting devices to a suitable supporting base, whether a pole or a substantially flat surface, such as a wall.

The invention comprises one or more holding devices or holders, and disengageable means for securing said holders, in any desired grouping, to a stationary supporting body.

The invention is especially adapted for securing the holders to metallic poles of any size, and comprises means whereby the holders may be adjusted as to inclination with respect to the vertical or horizontal plane.

Referring to the drawings, which illustrate merely by way of example, suitable means for effecting my invention;—

Similar numerals refer to similar parts throughout the several views.

Figure 2:
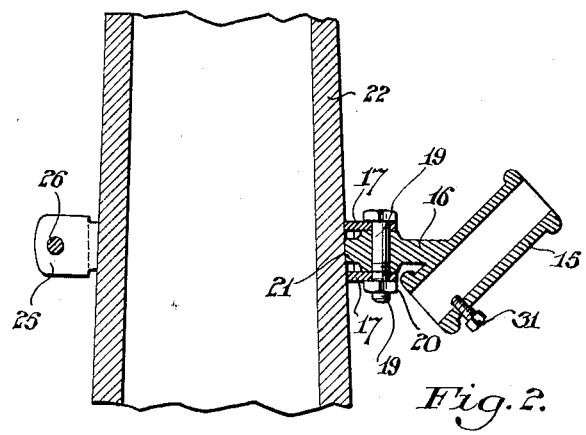
Fig. 2 is a vertical section on line 2, 2 of Fig. 1.

By way of example I have shown in the drawings my invention as adapted to holding or supporting flag staffs or similar objects.

Figures 1, 3:
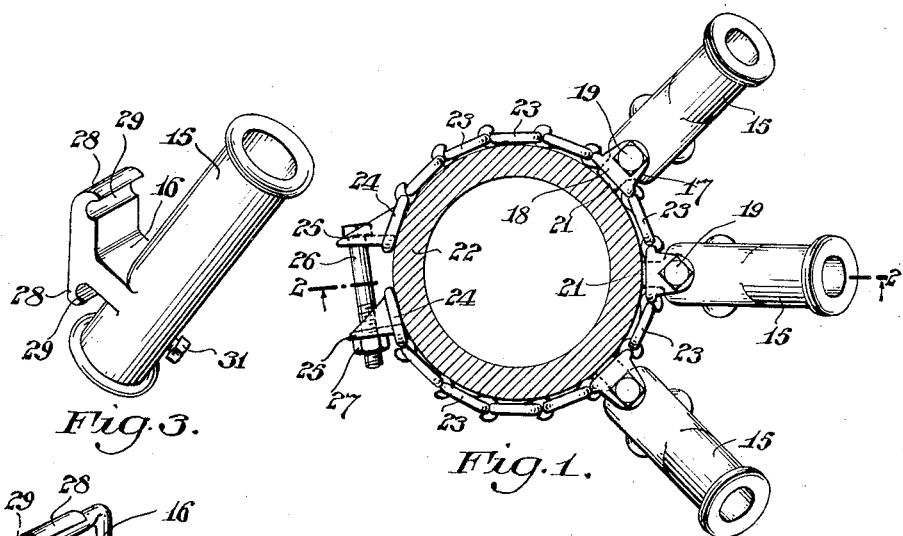
Fig. 1 is a plan view, showing the supporting pole in section.
Fig. 3 is a perspective view of another form of holder.

Referring to Figs. 1 and 2, the tubular socket members 15, which are adapted to receive the ends of the flag staffs, are provided with shanks 16 adapted to fit between the lugs 17 of a standard link element 18. A bolt 19 passes through these lugs 17 and the shank 16 and the parts are held in position by the nut 20. In Figs. 1 and 2 the shank 16 is shown as having a square rear extension 21 adapted to engage the supporting pole 22 to prevent any pivotal movement of the shank 16 on the bolt 19. It will be obvious that, by dispensing with this square extension, the shank may, if desired have a limited pivotal adjustable movement about the bolt 19, the position of adjustment being maintained by tightening up the nut 20. The link elements 18 having the lugs 17, are standard and are adapted to engage with other simple standard chain link elements 23. These link elements 18 and 23 are all disengageable, so that it will be obvious that any required number of links may be assembled to secure the extension of chain necessary to embrace the pole or other supporting structure. At the end of the strand or chain extension are provided other standard link elements such as 24, provided with apertured lugs 25 for receiving the tension bolt 26 having the nut 27, whereby the assembled chain or linked band may be securely clamped to the pole, as shown in Fig. 1.

It will be obvious that by properly assembling the link elements, the socket members 15 may be spaced any required distance apart; that is one or more link elements may be secured between the socket members, and any length of band or chain may be provided for encircling a pole or other support of any diameter. In other words the adjustment in this respect is practically unlimited.

Figures 4, 5, 6:
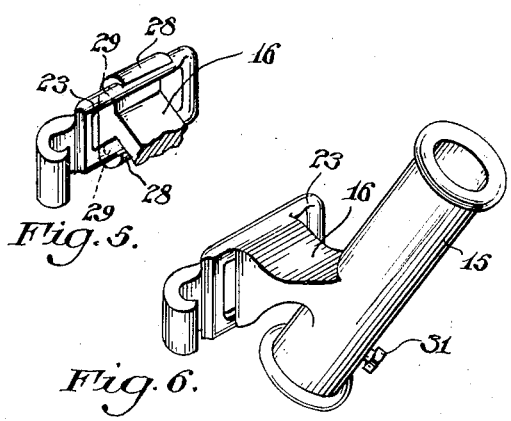
Fig. 4 is a longitudinal section thereof.
Fig. 5 is a perspective view with socket broken from the shank, showing the relation of a link element to the shank of the holder shown in Figs. 3 and 4.
Fig. 6 is a perspective view of another modified form of holder.

In Figs. 3, 4 and 5, I show another form of socket element having the shank 16 provided with the parallel curved lips 28 forming channels 29 for receiving the opposite parallel extensions of a simple link 23, as shown in Fig. 5. It will be noted that the lower lip 28 and the part of the shank 16, adjacent thereto cooperate with the lower extension 30 of the link as the fulcrum, and the weight of the socket member tends to hold the upper lip 28 in engagement with the upper extension 30.

In Fig. 6, I show the socket member made integral with the simple link 23, either by brazing the shank 16 thereto, or else by casting the link and shank integral.

Figure 7:
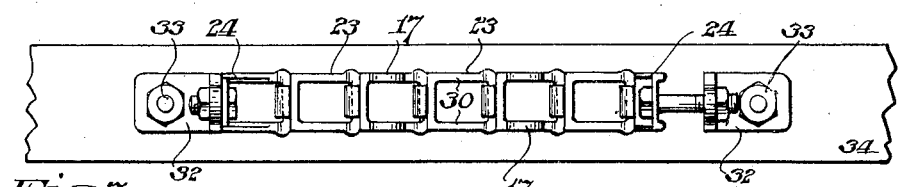
Fig. 7 is an elevation showing the supporting means attached to a substantially flat surface, the holders or staff sockets being removed.
Figure 8:
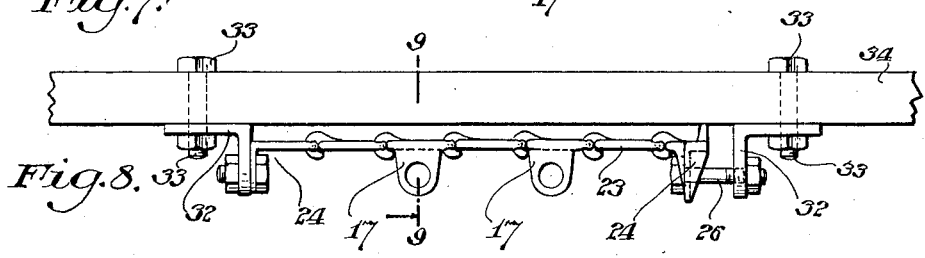
Fig. 8 is a plan view of same.
Figures 9, 10:
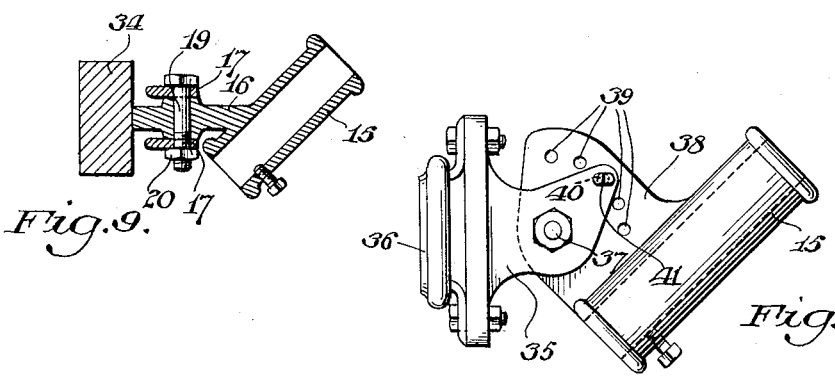
Fig. 9 is a section on line 9, 9 of Fig. 8, with the staff socket in place.
Fig. 10 is an elevation of a modified form.

In Figs. 7, 8 and 9, I show substantially the same elements as are shown in Figs. 1 and 2 in rectilinear formation. In this case two angles 32 are secured by bolts or studs 33, or similar devices, to the wall or supporting base 34. To these angles 32 are secured link elements 24 similar to elements 24 shown in Fig. 1. The tension bolt 26 has a substantial threaded extension for taking up slack.

Figure 11:
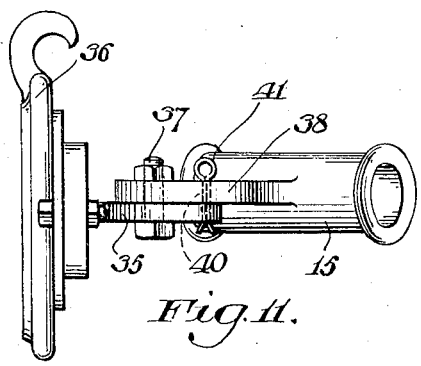
Fig. 11 is a plan view of the form shown in Fig. 10.

In Figs. 10 and 11, I show still another modification, in which a lug 35 is secured to or cast with a link element 36. This lug 35 is provided with a horizontal pivot bolt 37 engaging a lug 38 forming the shank of socket member 15. This lug or shank 38 is provided with a line of holes 39 in an arc of which the pivot bolt 37 is the center. The lug 35 is also provided with a hole 40 adapted to register with any of the holes 39 and a cotter pin 41 or similar device is provided to lock the lugs 35 and 38 in any desired relative angular adjustment. By this arrangement, it will be seen, means are provided for the angular adjustment of the socket, and consequently the flag staff held therein, with respect to the horizontal plane.

All of the sockets are preferably provided with a set-screw 31 for securing the flag staff in the socket.

While the invention has been specifically described as applied to a flag-holder, it should be understood that it may equally apply to other holding or supporting devices, and I therefore include in my application, claim for holding devices generally.

What I claim is:—

A flag holder comprising in combination with a stationary support, a tubular socket member having a shank, a chain formed of a number of separable links, means for disengageably securing said shank directly to a link, and means comprising a threaded element for securing under variable tension a terminal link of the chain for securing the chain in fixed relation in respect to the stationary support.

GEORGE H. DERBYSHIRE.